US011206865B2

(12) United States Patent
Muto

(10) Patent No.: US 11,206,865 B2
(45) Date of Patent: Dec. 28, 2021

(54) ADSORBENT, FILTER FOR SMOKING PRODUCT WHICH IS PROVIDED WITH SAID ADSORBENT, AND SMOKING PRODUCT PROVIDED WITH SAID FILTER FOR SMOKING PRODUCTS

(71) Applicant: JAPAN TOBACCO INC., Tokyo (JP)

(72) Inventor: Hiromichi Muto, Tokyo (JP)

(73) Assignee: JAPAN TOBACCO INC., Tokyo (JP)

( * ) Notice: Subject to any disclaimer, the term of this patent is extended or adjusted under 35 U.S.C. 154(b) by 492 days.

(21) Appl. No.: 16/239,118

(22) Filed: Jan. 3, 2019

(65) Prior Publication Data

US 2019/0133181 A1   May 9, 2019

Related U.S. Application Data

(63) Continuation of application No. PCT/JP2017/024391, filed on Jul. 3, 2017.

(30) Foreign Application Priority Data

Jul. 4, 2016   (JP) .............................. JP2016-132512

(51) Int. Cl.
| A24D 3/06 | (2006.01) |
| A24D 3/14 | (2006.01) |
| A24D 3/10 | (2006.01) |
| B01J 20/22 | (2006.01) |
| B01J 20/28 | (2006.01) |
| B01J 20/24 | (2006.01) |

(52) U.S. Cl.
CPC .............. *A24D 3/061* (2013.01); *A24D 3/10* (2013.01); *A24D 3/14* (2013.01); *B01J 20/22* (2013.01); *B01J 20/24* (2013.01); *B01J 20/28004* (2013.01); *B01J 20/28016* (2013.01)

(58) Field of Classification Search
None
See application file for complete search history.

(56) References Cited

U.S. PATENT DOCUMENTS

| 5,127,953 A | 7/1992 | Hamaguchi |
| 2003/0100635 A1 | 5/2003 | Ho et al. |
| 2004/0200490 A1 | 10/2004 | Inagaki et al. |
| 2016/0236171 A1 | 8/2016 | Hirano et al. |

FOREIGN PATENT DOCUMENTS

| CN | 87 2 16395 U | 9/1988 |
| JP | 46-12957 B1 | 4/1971 |
| JP | 58-57971 B2 | 12/1983 |
| JP | 64-27430 A | 1/1989 |
| JP | 11-35451 A | 2/1999 |
| JP | 2001-292729 A | 10/2001 |
| JP | 3910175 B2 | 4/2007 |
| JP | 2008-208043 A | 9/2008 |
| JP | 2009-11269 A | 1/2009 |
| JP | 2015-19589 A | 2/2015 |
| JP | 5936214 B1 | 6/2016 |
| KR | 10-2013-0052120 A | 5/2013 |
| WO | WO 2015/056680 A1 | 4/2015 |

OTHER PUBLICATIONS

Nassu et al, "Determination of melting point of vegetable oils and fats by differential scanning calorimetry (DSC) technique", Grasas y Aceites, v. 50. Fase. 1 (1999), pp. 16-22,[online], retr. Jul. 1, 2021, [retr.from Internet],<URL: http://grasasyaceites.revistas.csic.es>. (Year: 1999).*
Hydrogenated Vegetable Oils, ADM, [online], retr. Jul. 1, 2021, [retr.from Internet],<URL: https://www.admsio.com/en/hydrogenated-vegetable-oils/>. (Year: 2021).*
English translation of International Preliminary Report on Patentability and Written Opinion dated Jan. 17, 2019, in PCT/JP2017/024391 (Forms PCT/IB/338, PCT/IB/373, and PCT/ISA/237).
Korean Office Action dated Jun. 4, 2020, for Korean Application No. 10-2019-7002692, with an English translation.
Office Action dated Aug. 31, 2020, in Chinese Patent Application No. 201780039471.5.
International Search Report for PCT/JP2017/024391 dated Oct. 3, 2017.
Written Opinion of the International Searching Authority for PCT/JP2017/024391 (PCT/ISA/237) dated Oct. 3, 2017.
Extended European Search Report dated Jan. 28, 2020, in European Patent Application No. 17824211.1.

* cited by examiner

*Primary Examiner* — Dennis R Cordray

(74) *Attorney, Agent, or Firm* — Birch, Stewart, Kolasch & Birch, LLP

(57) ABSTRACT

Provided is an adsorbent which does not undergo the seeping of an oily component contained therein to an area surrounding the absorbent and has an excellent property to absorb a specific range of hydrocarbons. More specifically provided is a granular absorbent comprising a granular base material, an oil or fat having a melting point of 50° C. or higher and a polyol.

6 Claims, 1 Drawing Sheet

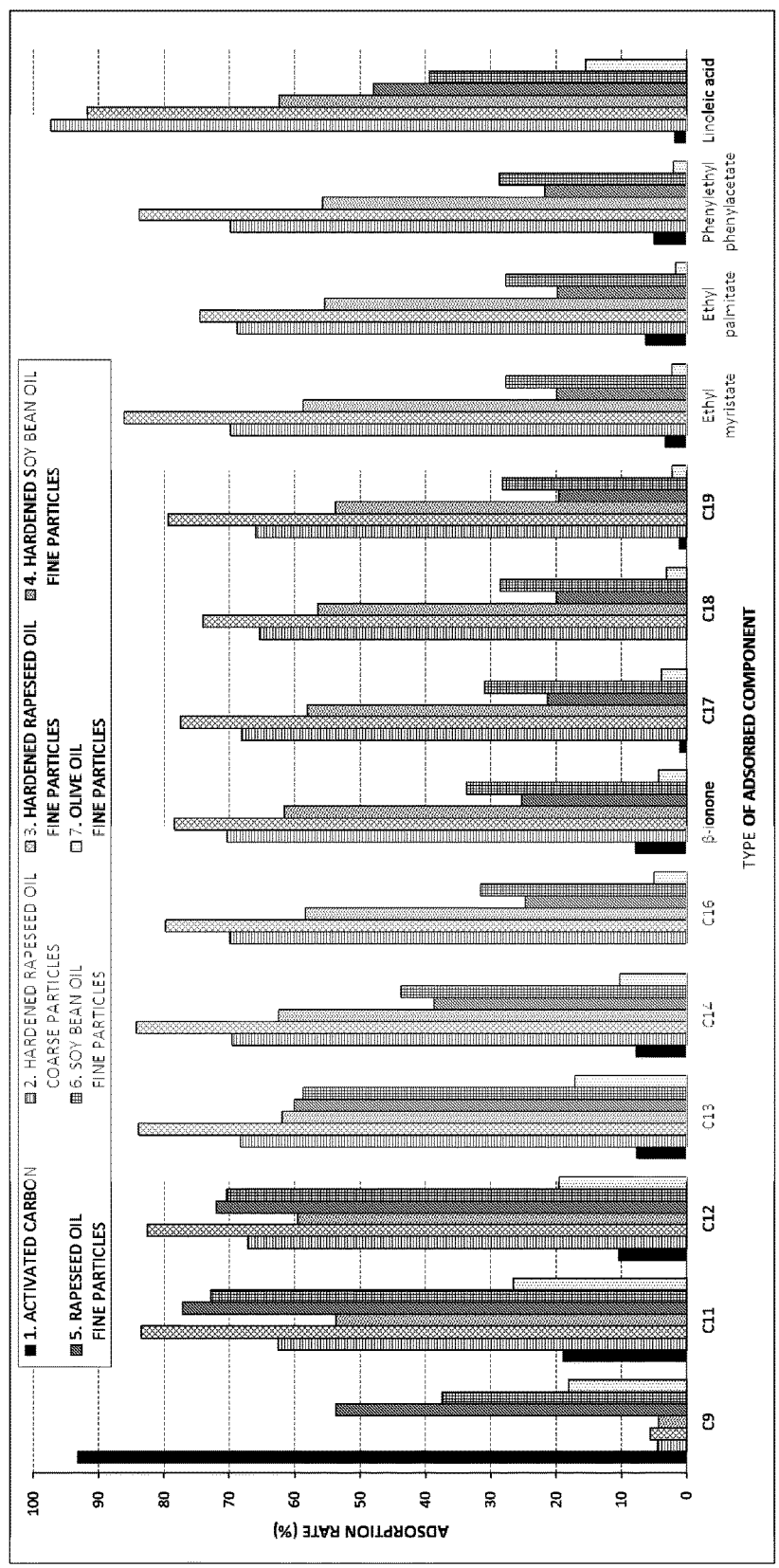

ADSORBENT, FILTER FOR SMOKING PRODUCT WHICH IS PROVIDED WITH SAID ADSORBENT, AND SMOKING PRODUCT PROVIDED WITH SAID FILTER FOR SMOKING PRODUCTS

CROSS REFERENCE TO RELATED APPLICATIONS

This application is a Continuation of PCT International Application No. PCT/JP2017/024391, filed on Jul. 3, 2017, which is claiming priority of Japanese Patent Application No. 2016-132512, filed on Jul. 4, 2016, all of which are hereby expressly incorporated by reference into the present application.

BACKGROUND OF THE INVENTION

Field of the Invention

The present invention relates to an adsorbent, a filter for a smoking article, which has said adsorbent, and a smoking article having said filter for a smoking article.

Techniques are known for adding additives to cigarette filters in order to filter out specific components contained in mainstream smoke of tobacco.

For example, Japanese Examined Patent Publication No. S46-12957 discloses adding an oil or fat and a sorbitan derivative to a filter raw material so as to absorb 3,4-benzopyrene and the like contained in mainstream smoke.

Japanese Patent No. 3910175 discloses a cigarette filter having at least three filter sections, with (A) a liquid fatty acid ester or liquid fatty acid having a viscosity within a specified range, (B) a glycol having a viscosity within a specified range and (C) activated carbon, respectively, being added to the filter sections. Japanese Patent No. 3910175 indicates that due to this configuration, components contained in mainstream smoke of tobacco can be efficiently filtered out.

SUMMARY OF THE INVENTION

As disclosed in Japanese Examined Patent Publication No. S46-12957, oil seepage can occur in cases where an oil or fat that is a liquid at ordinary temperature is added to a filter raw material.

In addition, among components contained in mainstream smoke, hydrocarbons having a number of carbon atoms that falls within the specific range highlighted in the present invention were not sufficiently adsorbed in cases where the activated carbon disclosed in Japanese Patent No. 3910175 was added as an adsorbent to a filter.

Therefore, the present invention addresses the problem of providing an adsorbent that exhibits excellent adsorption of hydrocarbons having a number of carbon atoms that falls within a specific range, without oil seeping into the surroundings of the adsorbent.

As a result of diligent research, the inventors of the present invention understood that the problem mentioned above could be solved by means of a granular adsorbent containing a granular base material, an oil or fat having a melting point of 50° C. or higher, and a polyol, and thereby completed the present invention.

That is, the present invention is as follows.

[1] A granular adsorbent comprising a granular base material, an oil or fat having a melting point of 50° C. or higher, and a polyol.

[2] The granular adsorbent according to [1], wherein the oil or fat having a melting point of 50° C. or higher is a hardened oil having a melting point of 50° C. or higher.

[3] The granular adsorbent according to [2], wherein the hardened oil having a melting point of 50° C. or higher is one or more types selected from the group consisting of extremely hardened palm oil, extremely hardened high-erucic acid rapeseed oil, extremely hardened rapeseed oil, extremely hardened soy bean oil, extremely hardened oil of beef tallow and extremely hardened oil of lard.

[4] The granular adsorbent according to any one of [1] to [3], wherein the granular base material is one or more types selected from the group consisting of dextrin, starch, powdered sugar and crystalline cellulose.

[5] The granular adsorbent according to any one of [1] to [4], wherein the content of the oil or fat having a melting point of 50° C. or higher is 10 to 60 wt % in the total amount of the absorbent as 100 wt %.

[6] A filter for a smoking article, which contains the granular adsorbent according to any one of [1] to [5].

[7] A smoking article having the filter for a smoking article according to [6].

When disposed in a filter for a smoking article, for example, the adsorbent of the present invention does not cause oil seepage into a surrounding filter material, and exhibits excellent adsorption of hydrocarbons having a number of carbon atoms that falls within a specific range that are contained in an inhaled substance such as mainstream smoke during smoking.

Further features of the present invention will become apparent from the following description of exemplary embodiments (with reference to the attached drawings).

BRIEF DESCRIPTION OF THE DRAWINGS

The drawing is a diagram that shows results of adsorption characteristics of components in smoke by adsorbents produced in Examples.

DESCRIPTION OF THE EMBODIMENTS

The present invention will now be explained in detail through the use of embodiments and examples, but the present invention is not limited to the embodiments and examples given below, and may be arbitrarily altered as long as there is no deviation from the gist of the present invention.

The adsorbent of the present invention contains a granular base material. The form of the granular base material may be powdered, but a form that can be readily dispersed in water is preferred. In the present invention, one or more types selected from the group consisting of dextrin, starch, powdered sugar and crystalline cellulose can be used as the granular base material.

Dextrin is a generic name for substances in which several α-glucose units are polymerized by means of glycoside bonds, is obtained by hydrolyzing starch by means of enzymes and the like, and is generally a starch hydrolyzate having a degree of polymerization (DE) of 20 or less. The raw material for the dextrin able to be used as the granular base material in the present invention is not particularly limited, but examples thereof include types of dextrin able to be commercially used, such as Pineflow, MAX1000 and Pinedex #100 (all of which can be procured from Matsutani Chemical Industry Co., Ltd.).

Starch refers to a natural polymer in which many α-glucose molecules are polymerized by means of glycoside bonds, and examples of types of starch able to be used as the granular base material in the present invention include Pineflow (which can be procured from Matsutani Chemical Industry Co., Ltd.).

Powdered sugar is obtained by, for example, grinding granulated sugar, and powdered sugar obtained from granulated sugar contains sucrose as a primary constituent component.

Crystalline cellulose refers to a refined product obtained by partially depolymerizing α-cellulose, which is obtained from fibrous plants, with an acid, and can be used as the granular base material in the present invention. Examples of crystalline cellulose include Ceolus and Celphere (both of which can be procured from Asahi Kasei Chemicals Corporation).

It is possible to use one of the granular base materials mentioned above, or a mixture of two or more types thereof.

In cases where dextrin is used as a granular base material, the proportion by weight of dextrin in the granular base material can be 30 wt % or more.

In cases where powdered sugar is used as a granular base material, the proportion by weight of powdered sugar in the granular base material can be 5 wt % or more.

In cases where crystalline cellulose is used as a granular base material, the proportion by weight of crystalline cellulose in the granular base material can be 1 wt % or more.

In cases where starch is used as a granular base material, the proportion by weight of starch in the granular base material can be 1 wt % or more.

Products produced from materials containing dextrin, powdered sugar and crystalline cellulose can be given as examples of the granular base material.

Here, the proportions by weight of the components can be 30 to 70 parts of dextrin, 5 to 10 parts of powdered sugar, and 0 to 30 parts of crystalline cellulose.

In addition, the content of the granular base material in the absorbent of the present invention can be 40 to 90 wt %, and preferably 50 to 80 wt % in the total amount of the absorbent as 100 wt %.

The adsorbent of the present invention contains an oil or fat having a melting point of 50° C. or higher. By incorporating an oil or fat having a melting point of 50° C. or higher, it is possible to prevent oil from seeping into the surroundings of the adsorbent. If the melting point is lower than 50° C., it is not possible to prevent oil from seeping into the surroundings of the adsorbent in cases where the adsorbent contains an oil or fat that is a liquid at normal temperature.

A hardened oil having a melting point of 50° C. or higher can be given as an example of an oil or fat having a melting point of 50° C. or higher.

A hardened oil is a processed oil obtained by hydrogenating an oil or fat that is a liquid at normal temperature, and it is preferable to use a hardened oil having a melting point of 50° C. or higher in the present invention.

Examples of hardened oils having melting point of 50° C. or higher include edible hardened oils such as extremely hardened palm oil, extremely hardened high-erucic acid rapeseed oil, extremely hardened rapeseed oil, extremely hardened soy bean oil, extremely hardened oil of beef tallow and extremely hardened oil of lard.

It is possible to use one type of oil or fat having a melting point of 50° C. or higher, or a mixture of two or more types thereof.

In addition, the content of the oil or fat having a melting point of 50° C. or higher in the absorbent of the present invention can be 10 to 60 wt %, preferably 10 to 40 wt %, and more preferably 20 to 30 wt % in the total amount of the absorbent as 100 wt %.

A content range such as that mentioned above is preferred in order to obtain an adsorbent having a granular form.

The adsorbent of the present invention contains a polyol. Examples of polyols include glycerin, glycols such as propylene glycol, saccharides and sugar alcohols. Of these, polyols that are liquids at normal temperature are preferred, and it is more preferable for the polyol to include at least glycerin.

In the present invention, it is surmised that granules that encapsulate the oil or fat having a melting point of 50° C. or higher are formed as a result of the granular base material such as dextrin, powdered sugar or crystalline cellulose, which exhibit both the characteristic of adsorbing the oil or fat and the characteristic of maintaining solidity upon granulation, being aggregated through the polyol.

In the present invention, it is thought that granules that encapsulate the oil or fat can be produced by causing a granular material that encapsulates an oil or fat to cohere in the granular base material such as dextrin, powdered sugar or crystalline cellulose through the polyol.

The usage quantity of the polyol in the adsorbent of the present invention can be decided as appropriate by a person skilled in the art, and can be, for example, 0.050 to 0.100, preferably 0.055 to 0.080, and more preferably 0.060 to 0.075, relative to 1 part by weight of the oil or fat.

The adsorbent of the present invention exhibits excellent adsorption capability of hydrocarbons having approximately 10 to 20 carbon atoms, as is clear from Examples given below. This is because the adsorbent of the present invention has the composition described above and, in particular, uses the oil or fat having a melting point of 50° C. or higher.

In terms of the size of the granular adsorbent, a mode in which the size of particles classified using a sieve is 250 to 1400 μm and a mode in which this size is 250 to 500 μm can be given as examples.

In addition, the granular adsorbent may be one in which granules are formed at a uniform size through cohesion.

In addition to the components mentioned above, other optional components, such as flavors, may be added to the adsorbent of the present invention. The content of such optional components can be 20 wt % or less, and is preferably 10 wt % or less in the total amount of the absorbent as 100 wt %.

The adsorbent of the present invention can be produced using, for example, a production method that includes steps such as those described below.

An example of a method for producing the adsorbent aspect of the present invention is one that includes a step of heating and melting an oil or fat having a melting point of 50° C. or higher at a temperature that is higher than the melting point of the oil or fat, and a step of adding the molten oil or fat to a granular base material, agitating, adding a polyol, agitating again, and then cooling. Following the cooling, it is possible to further include a grading step in order to crush and classify solidified granular lumps using a crushing and classifying means such as an oscillator.

70° C. to 80° C. can be given as an example of the temperature when the oil or fat having a melting point of 50° C. or higher is added.

In addition, in cases where two or more granular base materials are used, the granular base materials are mixed before being added to the molten oil or fat.

Applications of the adsorbent of the present invention are not particularly limited, but the adsorbent is preferably added to a filter for a smoking article.

In addition, a filter for smoking article may be one having a single filter section, but may also be one having multiple filter sections.

Here, filter section means a region that is delimited along the aspiration direction of a filter. In the case of a filter having multiple filter sections, the adsorbent should be added to at least one filter section.

In addition, the position of a filter section to which the adsorbent is to be added is not particularly limited, and examples of this position include a filter section on the mouthpiece side of a filter for smoking article, a filter section on the opposite side therefrom (the tobacco rod side in cases where the filter is connected to a tobacco rod) or a filter section located between these positions.

Modes in cases where the adsorbent is added to a filter for smoking article are not particularly limited, but an example thereof is a mode in which the adsorbent is filled in the filter by die filling.

Moreover, an example of a granular adsorbent added to a filter is a mode in which the granular adsorbent is uniformly dispersed in filter sections (in the case of a filter comprising a single section, the granular adsorbent is uniformly dispersed inside the entire filter), but another possible mode is one in which the adsorbent is eccentrically disposed in a filter.

A filter for smoking article may, if necessary, be wrapped in a wrapping paper used for wrapping filter materials.

Examples of filter materials include materials used in ordinary cigarette filters, such as paper and synthetic fibers, such as cellulose rayon fibers, cellulose acetate fibers and vinylon fibers, and it is possible to form a filter using a tow composed of these materials.

Furthermore, it is possible to form a filter without using fibers such as those mentioned above by combining the adsorbent of the present invention with a polymer such as high molecular weight polyethylene and a binder such as a cellulose derivative.

The length in the aspiration direction of the filter for a smoking article is not particularly limited, and it is possible to use a length that is used in conventional filters for smoking articles.

The amount of adsorbent added to the filter for a smoking article can be 15 to 200 mg, and preferably 25 to 80 mg, based on a filter length of 10 mm (a filter having a circumference of 16.8 to 25.8 mm).

In a filter for smoking article containing the adsorbent of the present invention, because oil does not seep from the adsorbent into the surroundings, oil does not seep into the filter material and oil does not seep into a wrapping paper to wrap the filter for a smoking article.

A filter for smoking article containing the adsorbent of the present invention can be used in a smoking article such as a cigarette or an electronic cigarette.

In cases where the adsorbent of the present invention is used in a cigarette, the filter can be used for constituting a filtered cigarette. A filtered cigarette of the present invention can be one having a conventional configuration, except that the adsorbent of the present invention is added to a filter.

Examples of such configurations include configurations that include a tobacco rod in which shredded tobacco is used as a filler, a filter for a smoking article, to which the adsorbent of the present invention is added, a wrapping paper to wrap a filter material of the filter for a smoking article, and a filter wrapping paper, such as a tipping paper to wrap the filter and the tobacco rod together, or a rod wrapping paper to wrap shredded tobacco of a tobacco rod.

Specifications such as dimensions and arrangements in these configurations can be similar to conventional conditions.

The positional relationship between a tobacco rod and a filter can be such that the filter is disposed at one end of the tobacco rod, in the same way as in cigarettes produced in the past.

In cases where the filter for a smoking article of the present invention is used in an electronic smoking device such as an electronic cigarette, it is possible to use configurations and dimensions of electronic smoking devices used in the past, except that the filter for a smoking article of the present invention is used.

As mentioned in the explanation above of the filter for smoking article, a smoking article having a filter in which the adsorbent of the present invention is contained therein is such that oil does not seep into the filter material and oil does not seep into a wrapping paper to wrap the filter for a smoking article. In addition, by using the adsorbent of the present invention, it is possible to adsorb specific components that could not be adsorbed by conventional adsorbents.

EXAMPLES

The present invention will now be explained in greater detail through the use of Examples, but the present invention is not limited to Examples given below as long as the gist of the present invention is not exceeded.

Raw materials used in Examples are as follows.
i) Oil or fat having a melting point of 50° C. or higher:
  Extremely hardened high-erucic acid rapeseed oil (melting point: 59° C.)
  This oil or fat has a saponification value of 177.5, an iodine value of 0.62 and an acid value of 0.04, and contains 6% to 48% of erucic acid as a fatty acid, with the remainder consisting of linolic acid, oleic acid, stearic acid, and the like.
  Extremely hardened soy bean oil (melting point: 67° C.)
  This oil or fat has a saponification value of 191.4, an iodine value of 0.86 and an acid value of 0.02, and is composed of palmitic acid, linolic acid, oleic acid, and the like, as fatty acids.
  Rapeseed oil, soy bean oil, olive oil (all of which are liquids at normal temperature)
ii) Granular base material: crystalline cellulose, powdered sugar, dextrin
iii) Glycerin
Tools and Equipment Used in Examples
i) Bread kneader (for kneading), oscillator (for crushing), oscillator mesh (opening size 1400 μm), JIS standard sieves (for classification, opening sizes 500 μm and 250 μm)
ii) Heater (for melting oil or fat), glass beaker (for kneading)
iii) Particle generator, brass tube, single cigarette smoking tool, Cambridge filter, impinger
<Granulation Method>
1) A granular base material comprising 60 wt % of dextrin, 6 wt % of powdered sugar and 1 wt % of crystalline cellulose was first agitated and mixed in a bread kneader.
2) 30 wt % of an oil or fat was weighed out. Extremely hardened high-erucic acid rapeseed oil and extremely hardened soy bean oil were placed in a glass beaker and melted by means of a heater. The preset temperature was set to 70° C. to 80° C.
3) Completely molten hardened oils, or rapeseed oil and soy bean oil, or olive oil were added under agitation to the mixture from step 1).

4) 3 wt % of glycerin was added under agitation.

5) Cooled and solidified granular lumps were crushed and classified into granules using an oscillator. A granular adsorbent comprising granules having diameters of 250 μm or more was collected.

Moreover, when the blending proportions of the oils or fats were increased or decreased, the blending proportions of these in the adsorbent were decreased or increased so that the blending proportion of dextrin, powdered sugar or crystalline cellulose did not change.

<Production of Prototype filter>

The granular adsorbent obtained using the method described above was filled in an acetate filter part of a commercially available cigarette by die filling (handmade). The 27 mm long acetate filter was cut to lengths of 10 mm and 17 mm. 50 mg of the granular adsorbent was filled between the 10 mm filter and the 17 mm filter.

Test Example 1

Component Adsorption Characteristics of Granular Adsorbent

A model test system obtained by arranging a particle generator, a brass tube, a Cambridge filter, an impinger and a single cigarette smoking tool in series was used.

100 mg of the granular adsorbent obtained in the manner described above was filled in the brass tube. Next, 10 mL of methanol (containing 5 μL/mL of n-decane as an internal standard substance) was filled in the impinger.

A mixed liquid of components such as saturated hydrocarbons (and containing propylene glycol as a solvent) was injected into the particle generator using a microsyringe and heated to 200° C. so as to form particles from the components.

6 μL of the mixed liquid was injected per aspiration.

The smoking tool was operated at an aspiration volume of 35 mL, an aspiration time of 2 seconds, an aspiration interval of 30 seconds, and a total of 30 aspirations.

Following the aspiration, the granular adsorbent part of the brass tube, apart of the Cambridge filter and a part of the impinger were each extracted using 10 mL of methanol (internal standard substance, containing 5 μL/mL of n-decane).

The obtained extracts were subjected to GC/MS, and the peak area of each part was calculated.

Adsorption performance of the components by the granular adsorbent was calculated.

Adsorption Characteristics of Components in Smoke (the Drawing)

It was confirmed that adsorbents containing 30 wt % of extremely hardened high-erucic acid rapeseed oil could adsorb 50% or more of smoke components such as saturated hydrocarbon compounds having 11 or more carbon atoms and having a vapor pressure of 1 mmHg or less.

Among the granular adsorbents obtained using extremely hardened high-erucic acid rapeseed oil, it was confirmed that granules having diameters of 250 to 500 μm tended to exhibit higher component adsorption rates than granular adsorbents having diameters of 250 to 1400 μm.

Granular adsorbents containing 30 wt % of extremely hardened soy bean oil exhibited similar component adsorption tendencies to the granular adsorbents containing 30 wt % of extremely hardened high-erucic acid rapeseed oil.

Granular adsorbents containing 30 wt % of rapeseed oil or soy bean oil exhibited different component adsorption tendencies from granular adsorbents obtained using hardened oils.

Granular adsorbents containing 30 wt % of olive oil exhibited low adsorption rates of smoke components such as saturated hydrocarbon compounds having 11 or more carbon atoms and having a vapor pressure of 1 mmHg or less.

On the horizontal axis (type of adsorbed component) in the drawing, numbers next to "C", such as "C9", means a hydrocarbon having 9 carbon atoms (nonane in this case).

In addition, in the legend in the diagram, "coarse granules" means granules having diameters of 250 to 1400 μm, and "fine granules" means granules having diameters of 250 to 500 μm.

Test Example 2

Verification of Oil Seepage in Cigarettes Filled with Granular Adsorbents

Prototype cigarette filters prepared in the manner described above were allowed to stand for one week.

After one week, it was confirmed visually whether or not oil seepage had occurred in wrapping papers or tipping papers of the prototype cigarette filters.

It was confirmed that in the case of granular adsorbents containing 10 to 60 wt % of extremely hardened high-erucic acid rapeseed oil or extremely hardened soy bean oil, oil did not seep into wrapping papers or tipping papers even after time had passed.

TABLE 1

Relationship between type of oil or fat and oil seepage

| Type of oil or fat | Blending proportion (%) | Oil seepage |
|---|---|---|
| Extremely hardened high-erucic acid rapeseed oil | 10 | No |
| | 20 | No |
| | 30 | No |
| | 60 | No |
| Extremely hardened soy bean oil | 30 | No |
| Rapeseed oil | 30 | Yes |
| Soy bean oil | 30 | Yes |
| Olive oil | 30 | Yes |

The adsorbent of the present invention shows a difference in adsorption capability of adsorbed components compared to activated carbon, which was known in the past as an adsorbent. Therefore, in addition to being added to the filter for smoking article disclosed in the present description, the adsorbent of the present invention can be used as an adsorbent used in other products.

In addition, a filter for a smoking article containing the adsorbent of the present invention is not limited to cigarettes, and can also be used in other smoking articles, such as filters for electronic cigarettes.

What is claimed is:

1. A filter for a smoking article, containing a granular adsorbent comprising a granular base material, an oil or fat having a melting point of 50° C. or higher, and a polyol.

2. The filter for a smoking article according to claim 1, wherein the oil or fat having a melting point of 50° C. or higher is a hardened oil having a melting point of 50° C. or higher.

3. The filter for a smoking article according to claim 2, wherein the hardened oil having a melting point of 50° C. or higher is one or more oils selected from the group consisting of extremely hardened palm oil, extremely hardened high-erucic acid rapeseed oil, extremely hardened rapeseed oil, extremely hardened soy bean oil, extremely hardened oil of beef tallow and extremely hardened oil of lard.

4. The filter for a smoking article according to claim 1, wherein the granular base material is one or more materials selected from the group consisting of dextrin, starch, powdered sugar and crystalline cellulose.

5. The filter for a smoking article according to claim 1, wherein the content of the oil or fat having a melting point of 50° C. or higher is 10 to 60 wt % in the total amount of the absorbent as 100 wt %.

6. A smoking article having a filter for a smoking article, containing a granular adsorbent comprising a granular base material, an oil or fat having a melting point of 50° C. or higher, and a polyol.

* * * * *